United States Patent
Satija et al.

(10) Patent No.: US 11,336,646 B2
(45) Date of Patent: *May 17, 2022

(54) ALTERNATE USER COMMUNICATION ROUTING

(71) Applicant: BANK OF AMERICA CORPORATION, Charlotte, NC (US)

(72) Inventors: Dharmender Kumar Satija, Rye Brook, NY (US); Eren Kursun, New York, NY (US); Andrew DongHo Kim, Glendale, AZ (US); Scott Anderson Sims, Tega Cay, SC (US); Craig D. Widmann, Chandler, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/915,371

(22) Filed: Jun. 29, 2020

(65) Prior Publication Data
US 2020/0329043 A1    Oct. 15, 2020

Related U.S. Application Data

(63) Continuation of application No. 15/995,830, filed on Jun. 1, 2018, now Pat. No. 10,785,220.

(51) Int. Cl.
*H04L 29/06* (2006.01)

(52) U.S. Cl.
CPC ...... *H04L 63/0876* (2013.01); *H04L 63/0838* (2013.01)

(58) Field of Classification Search
CPC .................. H04L 63/0876; H04L 63/0838
See application file for complete search history.

(56) References Cited

U.S. PATENT DOCUMENTS

| 5,351,290 A | 9/1994 | Naeini et al. |
| 5,602,906 A | 2/1997 | Phelps |

(Continued)

FOREIGN PATENT DOCUMENTS

EP    1986110 A2    10/2008

OTHER PUBLICATIONS

Sun, Jianhua, and Kun Sun, "DESIR: Decoy-enhanced seamless IP randomization." IEEE INFOCOM 2016—The 35th Annual IEEE International Conference on Computer Communications, IEEE, 2016. (Year: 2016).

(Continued)

*Primary Examiner* — Shawnchoy Rahman
(74) *Attorney, Agent, or Firm* — Moore & Van Allen PLLC; Nicholas C. Russell

(57) ABSTRACT

A system and methods for alternate user communication routing are described. Unauthorized users are identified and alternate treatments are provided in order to deter unauthorized access and create opportunities for data collection. The use of a varied set of alternate treatments provides an enhanced view of unauthorized user behavior and an increased ability to track future unauthorized user actions by recording various user identity/communication characteristics specific to known unauthorized users. Alternate treatments may be provided randomly based on a set of alternate treatments previously provided to a specific user, or may be varied based on an identified group of unauthorized users presumed to be acting in concert.

20 Claims, 3 Drawing Sheets

(56) References Cited

U.S. PATENT DOCUMENTS

| | | |
|---|---|---|
| 5,706,338 A | 1/1998 | Relyea et al. |
| 5,719,560 A | 2/1998 | Watkins |
| 5,768,354 A | 6/1998 | Lange et al. |
| 5,805,686 A | 9/1998 | Moller et al. |
| 5,937,068 A | 8/1999 | Audebert |
| 6,163,604 A | 12/2000 | Baulier et al. |
| 6,219,538 B1 | 4/2001 | Kaminsky et al. |
| 6,327,352 B1 | 12/2001 | Betts et al. |
| 6,396,916 B2 | 5/2002 | Jordan |
| 6,594,684 B1 | 7/2003 | Hodjat et al. |
| 6,643,362 B2 | 11/2003 | Hogan et al. |
| 6,792,113 B1 | 9/2004 | Ansell et al. |
| 6,856,982 B1 | 2/2005 | Stevens et al. |
| 7,106,845 B1 | 9/2006 | Zhuk et al. |
| 7,251,624 B1 | 7/2007 | Lee et al. |
| 7,266,734 B2 | 9/2007 | Chavez, Jr. et al. |
| 7,327,837 B1 | 2/2008 | Harlow et al. |
| 7,328,453 B2 * | 2/2008 | Merkle, Jr. ............. G06F 12/08 711/6 |
| 7,471,194 B2 | 12/2008 | Itou |
| 7,568,133 B1 | 7/2009 | Bette et al. |
| 7,624,277 B1 | 11/2009 | Simard et al. |
| 7,984,500 B1 * | 7/2011 | Khanna ............... H04L 63/1483 709/225 |
| 8,031,849 B1 | 10/2011 | Apple et al. |
| 8,359,006 B1 | 1/2013 | Zang et al. |
| 8,411,833 B2 | 4/2013 | Dolan et al. |
| 8,725,810 B1 | 5/2014 | Bau |
| 8,856,879 B2 | 10/2014 | Schechter et al. |
| 8,869,251 B2 | 10/2014 | Miller et al. |
| 8,910,251 B2 * | 12/2014 | Shepard ................ H04L 63/083 726/5 |
| 8,955,143 B1 | 2/2015 | Ramalingam et al. |
| 9,069,934 B1 | 6/2015 | Meeboer |
| 9,094,469 B1 | 7/2015 | Wilder et al. |
| 9,203,962 B2 | 12/2015 | Guerra et al. |
| 9,270,833 B2 | 2/2016 | Ballai et al. |
| 9,363,267 B2 * | 6/2016 | Sugihara ............ H04L 63/1466 |
| 9,372,777 B2 | 6/2016 | Dhoolia et al. |
| 9,419,988 B2 | 8/2016 | Alexander |
| 9,426,302 B2 | 8/2016 | Layman et al. |
| 9,674,177 B1 | 6/2017 | Nyström |
| 9,699,660 B1 | 7/2017 | Blatt et al. |
| 9,774,726 B1 | 9/2017 | Jenkins et al. |
| 9,785,765 B2 | 10/2017 | Samineni |
| 10,110,629 B1 | 10/2018 | Kruse et al. |
| 10,390,319 B2 | 8/2019 | Kalhan |
| 10,839,468 B2 | 11/2020 | Odegard |
| 2004/0249866 A1 | 12/2004 | Chen et al. |
| 2005/0278550 A1 | 12/2005 | Mahone et al. |
| 2006/0136595 A1 | 6/2006 | Satyavolu |
| 2007/0124246 A1 | 5/2007 | Lawyer et al. |
| 2007/0237093 A1 | 10/2007 | Rajagopalan et al. |
| 2008/0022119 A1 | 1/2008 | Lim et al. |
| 2008/0140447 A1 | 6/2008 | Pourfallah et al. |
| 2009/0106826 A1 | 4/2009 | Palestrant |
| 2009/0327131 A1 | 12/2009 | Beenau et al. |
| 2010/0005519 A1 | 1/2010 | Lim |
| 2010/0070300 A1 | 3/2010 | Anderson et al. |
| 2010/0229223 A1 | 9/2010 | Shepard et al. |
| 2010/0293608 A1 | 11/2010 | Schechter et al. |
| 2011/0214182 A1 | 9/2011 | Adams et al. |
| 2012/0054834 A1 | 3/2012 | King |
| 2012/0066003 A1 | 3/2012 | Collier et al. |
| 2012/0263285 A1 | 10/2012 | Rajakumar et al. |
| 2012/0287810 A1 | 11/2012 | Shim et al. |
| 2013/0051549 A1 | 2/2013 | Klemm |
| 2013/0257625 A1 | 10/2013 | Holle |
| 2013/0336169 A1 | 12/2013 | Tai et al. |
| 2014/0007185 A1 | 1/2014 | Han et al. |
| 2014/0041055 A1 | 2/2014 | Shaffer et al. |
| 2014/0129585 A1 | 5/2014 | Furniss et al. |
| 2014/0157382 A1 | 6/2014 | Ford |
| 2014/0298469 A1 | 10/2014 | Marion et al. |
| 2015/0124957 A1 | 5/2015 | Roncoroni et al. |
| 2015/0281210 A1 | 10/2015 | Weisberger |
| 2016/0094551 A1 | 3/2016 | Sugihara et al. |
| 2016/0165182 A1 | 6/2016 | Mande et al. |
| 2017/0164204 A1 | 6/2017 | Fitzgerald et al. |
| 2017/0295567 A1 | 10/2017 | Chen et al. |
| 2018/0083989 A1 | 3/2018 | Boss et al. |
| 2018/0248972 A1 | 8/2018 | Ahuja |
| 2019/0058733 A1 | 2/2019 | Wright |
| 2019/0215337 A1 | 7/2019 | Trabelsi et al. |
| 2019/0245877 A1 | 8/2019 | Toth et al. |
| 2019/0311102 A1 * | 10/2019 | Tussy .................... G06F 21/32 |

OTHER PUBLICATIONS

Stolfo, Salvatore J., Malek Ben Salem, and Angelos D. Keromytis, "Fog computing: Mitigating insider data theft attacks in the cloud", 2012 IEEE symposium on security and privacy workshops, IEEE, 2012. (Year: 2012).

* cited by examiner

ALTERNATE USER COMMUNICATION ROUTING

CROSS-REFERENCE OF RELATED APPLICATIONS

This application is a continuation of U.S. patent application Ser. No. 15/995,830, filed Jun. 1, 2018, entitled "Alternate User Communication Routing," the entirety of which is incorporated herein by reference.

FIELD

The present invention relates generally to deterring unauthorized users, and more particularly, to identifying unauthorized users and providing alternate treatments to deter the unauthorized users from accessing information.

BACKGROUND

Organizations institute systems and procedures for handling unauthorized users and/or unauthorized access requests. These systems and procedures are tailored to identifying potential unauthorized users and/or unauthorized requests. However, improved systems and procedures are needed for identifying potential unauthorized users and/or unauthorized requests and also to respond to the unauthorized users to deter (e.g., prevent and/or reduce) future unauthorized requests.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for improved handling of unauthorized users and/or unauthorized access requests. It should be understood that the present invention is not limited to use by a specific type of organization, company, agency, institution and the like. Rather, the described systems, computer products and methods for improved handling of unauthorized users and/or unauthorized access requests can be employed in any instance where it is beneficial to identify, monitor, and deter such use and behavior. The present invention is premised by the recognition that unauthorized users may often attempt to take advantage of an organization's security protocols and internal processes in efforts to bypass security systems and policies. With that in mind, the present invention is aimed at preventing unauthorized users from gaining access to systems or information by providing a variety of alternate treatments in order to thwart the unauthorized users' ability to detect patterns within an organization or system's internal processes and security protocols. For example, the alternate treatment may be different than what treatment would be provided to an authorized user, or what treatment may be typically provided to an unauthorized user. In addition, the use of alternate treatments increases the amount and variety of data collected for unauthorized users, providing an enhanced view of unauthorized user behavior and an increased ability to track unauthorized user actions.

In some embodiments, alternate user communication routing consists of receiving a request for an action via a communication from a user via a communication channel from one or more communication channels, determining authentication credentials for the user from the communication, determining that the user is an unauthorized user based on the authentication credentials, providing an alternate treatment to the unauthorized user, and capturing information from the unauthorized user based on the communication and the user's response to the alternate treatment.

In some embodiments, the authentication credentials are user information or device information received from the communication with the user.

In some embodiments, the alternate treatment comprises providing an extended period of hold time via one or more communication channels.

In some embodiments, the alternate treatment comprises providing alternative resource pool information.

In some embodiments, the alternate treatment comprises requesting additional contact information from the unauthorized user in order to contact the unauthorized user at a later time via a second communication channel.

In some embodiments, the invention is further configured to alert a representative communicating with the unauthorized user that the unauthorized user is unauthorized.

In some embodiments, the invention is further configured to prevent alerting a representative communicating with the unauthorized user that the unauthorized user is unauthorized.

In some embodiments, the invention is further configured to identify one or more previous alternate treatments provided to the unauthorized user, randomly select the alternate treatment based on the one or more previous alternate treatments, and record the use of the alternate treatment. In some embodiments, the alternate treatment randomly selected is different than the one or more previous alternate treatments.

In some embodiments, the alternate treatment comprises requesting a first additional authentication credential, receiving a first response with the first additional authentication credential from the unauthorized user, denying access to the unauthorized user based on the first response, requesting one or more additional authentication credentials, receiving one or more additional responses with the one or more additional authentication credentials from the unauthorized user, and based on the one or more additional responses, granting the action requested by unauthorized user with limitations.

In some embodiments, the alternate treatment comprises disabling one or more particular features associated with an action request from the unauthorized user.

In some embodiments, the alternate treatment comprises providing a request identifier, wherein the request identifier is a specific number associated with an unauthorized user.

In some embodiments, the alternate treatment comprises providing one or more alternative authentication credentials to the unauthorized user, wherein the alternative authentication credentials are specific to the unauthorized user or a particular group of unauthorized users.

In some embodiments, the alternate treatment comprises creating the appearance of naturally occurring communication issues by extending the time for which a response to the unauthorized user request is instituted.

In some embodiments, the alternate treatment comprises providing a tagged one-time authentication credential, wherein the tagged one-time authentication credential a specific string of characters or phrases specific to the unauthorized user.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
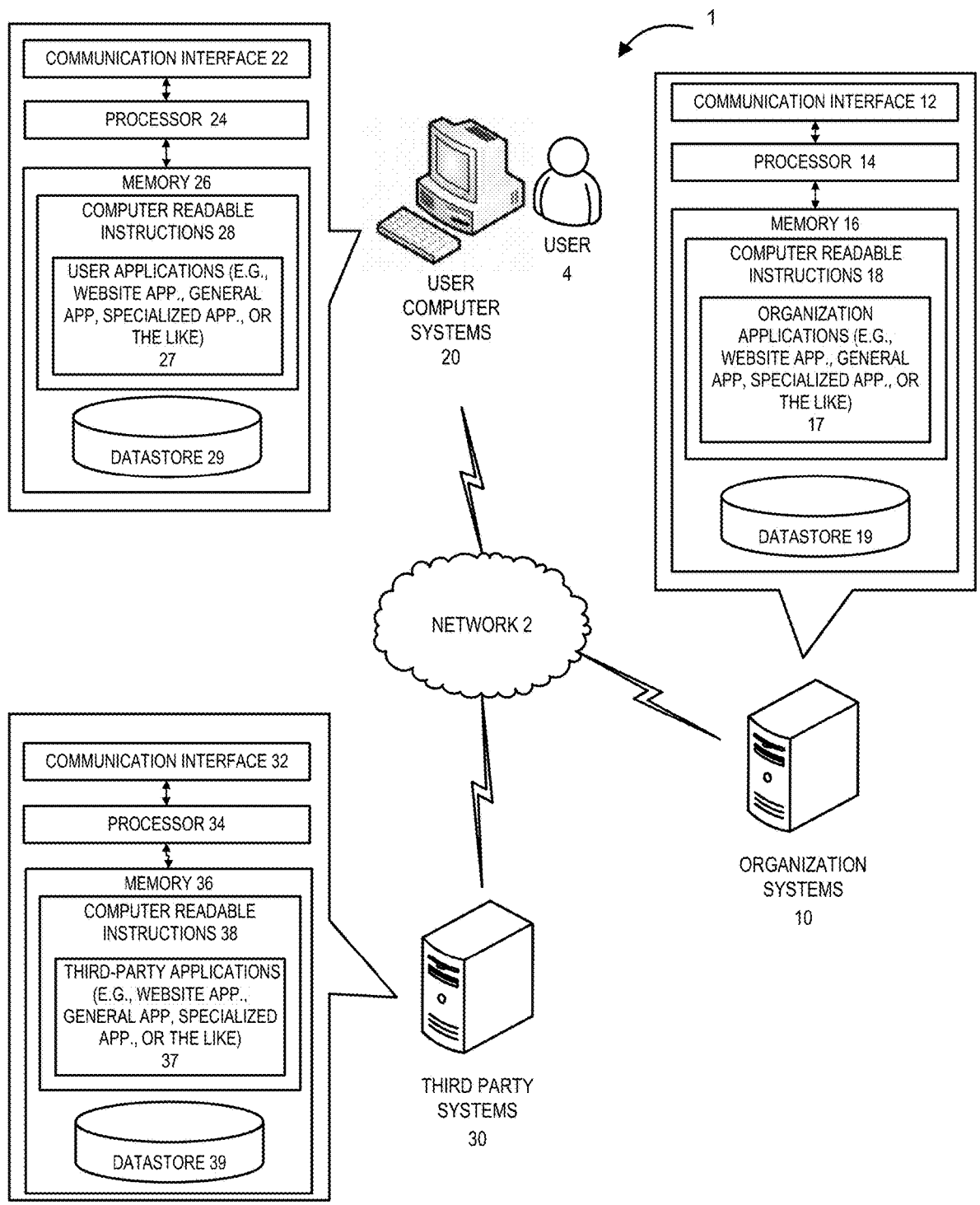

Having thus described embodiments of the invention in general terms, reference will now be made to the accompanying drawings, and wherein:

FIG. 1 illustrates a block diagram of an unauthorized user determination and treatment system environment, in accordance with one or more embodiments of the invention.

Figure 2:
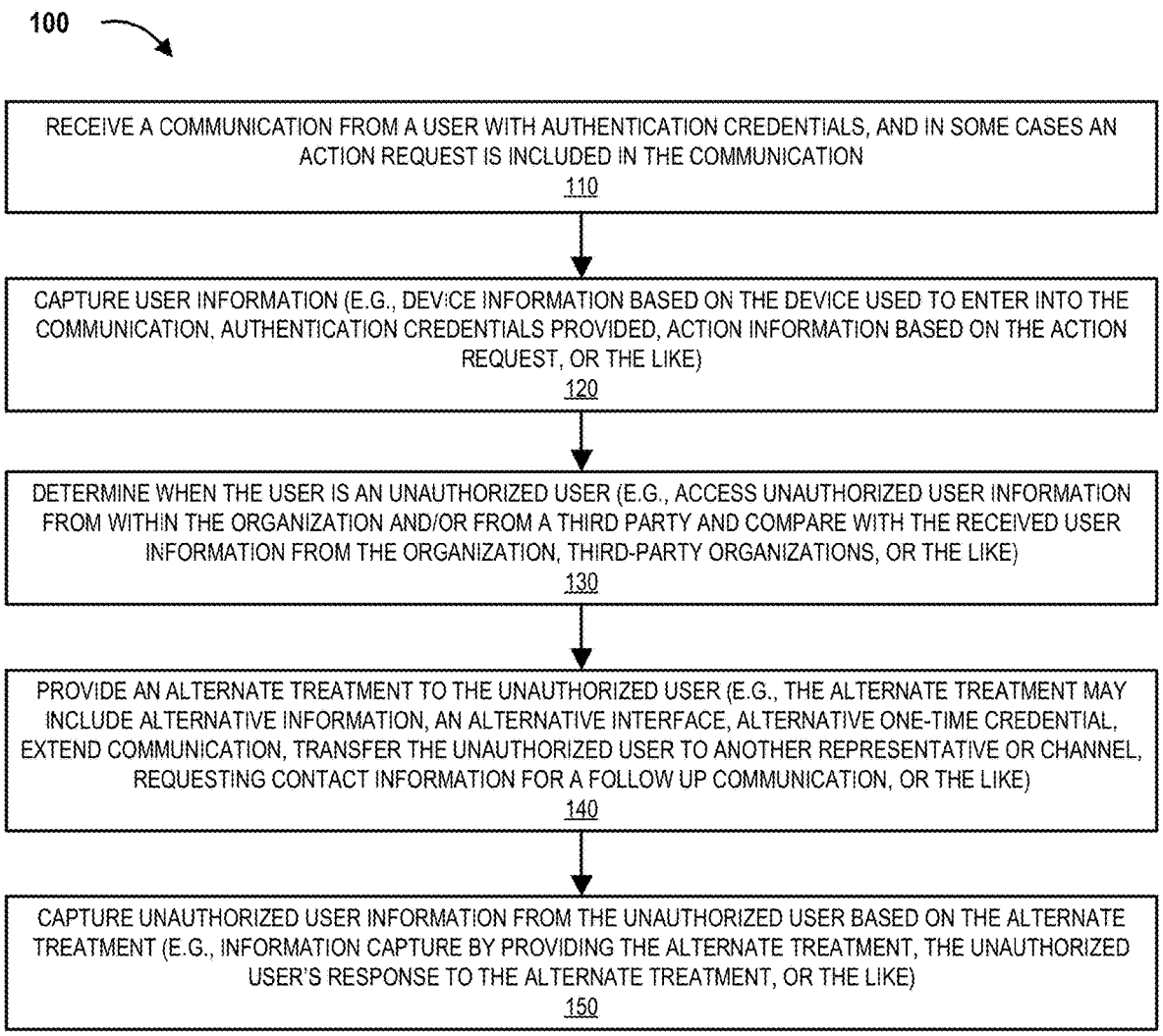

FIG. 2 illustrates a high level process flow for determining an unauthorized user and providing an alternate treatment to the unauthorized user, in accordance with embodiments of the invention.

Figure 3:
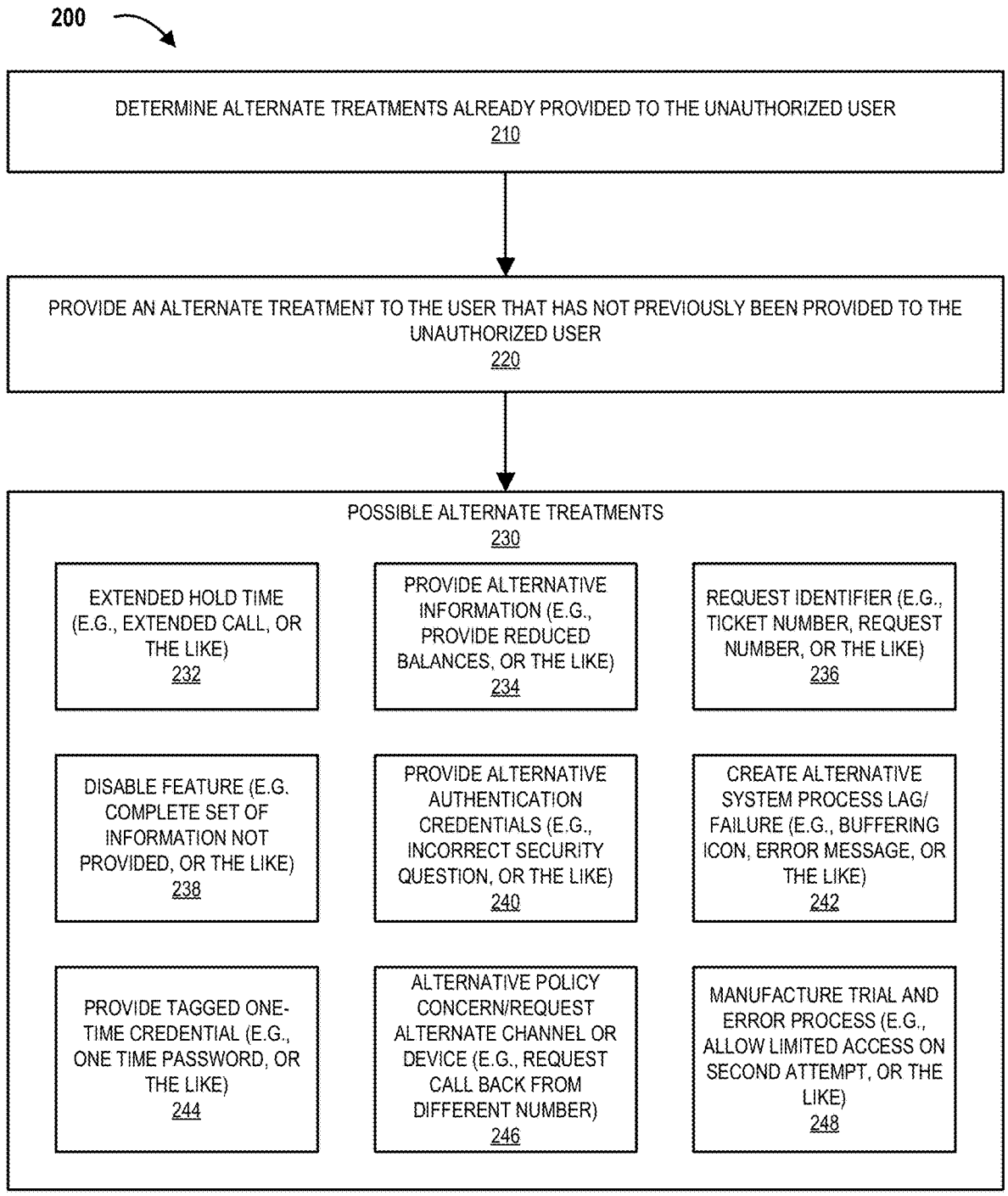

FIG. 3 illustrates a process flow for providing one or more of a set of various possible alternate treatments to unauthorized users, in accordance with embodiments of the present invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed for improved handling of unauthorized users and/or unauthorized access requests can be employed in any instance where it is beneficial to identify, monitor, and deter such use and behavior. The present invention is premised by the recognition that unauthorized users may often attempt to take advantage of an organization's security protocols and internal processes in efforts to bypass security systems and policies. With that in mind, the present invention is aimed at preventing unauthorized users from gaining access to systems or information by providing a variety of alternate treatments in order to thwart the unauthorized users' ability to detect and take advantage of patterns within an organization or system's internal processes and security protocols. For example, the alternate treatment may be different than what treatment would be provided to an authorized user, or what treatment may be typically provided to an unauthorized user. In addition, the use of alternate treatments increases the amount and variety of data collected for unauthorized users, providing an enhanced view of unauthorized user behavior and an increased ability to track unauthorized user actions.

FIG. 1 illustrates an alternate treatment system environment 1, in accordance with embodiments of the invention. As illustrated in FIG. 1, one or more organization systems 10 are operatively coupled, via a network 2, to one or more user computer systems 20 (e.g., authorized user systems and/or unauthorized user systems), one or more third-party systems 30, and/or one or more other systems (not illustrated). In this way, the organization systems 10 may receive communications, including authentication credentials, or the like, from a user 4 (e.g., one or more associates, employees, agents, contractors, sub-contractors, third-party representatives, customers, or the like), which may be an authorized user or an unauthorized user, and thereafter, utilize the systems and processes described herein to identify unauthorized users, capture additional information for unauthorized users, and/or prevent future actions by unauthorized users. As such, the one or more organization systems 10 may be utilized to identify unauthorized users and take actions in order to capture unauthorized user information from the unauthorized users through communication with the user computer systems 20, the third party systems 30, and/or the other systems, as will be discussed in further detail herein. As such, embodiments of the present invention allow for improved security through improved identification and monitoring of unauthorized users.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more third-party systems 30, and/or one or more other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., web-based applications, dedicated applications, specialized applications, or the like that are used to monitor, communicate with, and/or take actions with respect to the authorized users and/or unauthorized users). In some embodiments, the one or more memory components 16 include one or more data stores 19 for storing data related to the one or more organization systems 10, including, but not limited to, data created, accessed, and/or used by the one or more organization applications 17. The one or more organization applications 17 may be applications that are specifically used for providing services to authorized users, for monitoring, communicating with, and/or capturing information from unauthorized users, and/or the like (e.g., by interacting with the user computer systems 20 and user applications 27, the third party systems 30 and third party applications 37, or other systems).

As illustrated in FIG. 1, users 4 may try to access the organization systems 10 in order to access information from the organization systems (e.g., organization information, user information, resource pool information, or the like). In some embodiments the users 4 may be authorized users, such as users that are supposed to have access to the organization systems and/or associated applications, alternatively, the users may be unauthorized users, such as users that are trying to misappropriate information from authorized users, the organization, and/or third-parties, or the like. The users 4 may utilize the user computer systems 20 (e.g., authorized user computer systems or unauthorized user computer systems) to communicate with and/or access information from the organization systems 10. As such, it should be understood that the one or more user computer systems 20 may be any type of device, such as a desktop, mobile device (e.g., laptop, smartphone device, PDA, tablet, watch, wearable device, or other mobile device), server, or any other type of system hardware that generally comprises one or more communication components 22, one or more processor components 24, and one or more memory components 26, and/or the user applications 27 used by any of the foregoing, such as web browsers applications, dedicated applications, specialized applications, or portions thereof.

The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, the one or more third-party systems 30, and/or the one or more other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other applications that allow the one or more user computer systems 20 to operate, that allow users 4 to access and/or take various actions with respect to the one or more organizations systems 10 through the use of the one or more user computer systems 20, or the like.

As illustrated in FIG. 1, the one or more third-party systems 30 may communicate with the one or more organization systems 10 and/or the one or more user computer systems 20 directly or indirectly. The one or more third party systems 30, and/or third-party applications 37 thereof, may provide additional information to the one or more organization systems 10. As such, the one or more third-party systems 30 are operatively coupled, via a network 2, to the one or more organization systems 10, the one or more user computer systems 20, and/or the one or more other systems. The one or more third-party systems 30 generally comprise one or more communication components 32, one or more processor components 34, and one or more memory components 36.

The one or more processor components 34 are operatively coupled to the one or more communication components 32, and the one or more memory components 36. The one or more processor components 34 use the one or more communication components 32 to communicate with the network 2 and other components on the network 2, such as, but not limited to, the one or more organization systems 10, the one or more user computer systems 20, and/or the one or more other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more third-party systems 30 may have computer-readable instructions 38 stored in the one or more memory components 36, which in some embodiments includes the computer-readable instructions 38 of one or more third party applications 37 that provide user information (e.g., authorized user information and/or unauthorized user information) to the one or more organization systems 10. The access to the one or more third-party systems 30, or applications thereof, may be controlled by the one or more organization systems 10 and/or one or more user computer systems 20, as will be described herein.

Moreover, as illustrated in FIG. 1, the one or more other systems (not illustrated) may be operatively coupled to the one or more organization systems 10, the one or more user computer systems 20, and/or the one or more third-party systems 30, through the network 2. The other systems have features that are the same as or similar to the features described with respect to the one or more organization systems 10, the one or more user computer systems 20, and/or the one or more third-party systems 30 (e.g., one or more communication components, one or more processor components, and one or more memory components with computer-readable instructions of one or more applications, one or more datastores, or the like). Thus, the one or more other systems communicate with the one or more organization systems 10, the one or more user computer systems 20, the one or more third-party systems 30, and/or each other in same or similar way as previously described with respect to the one or more organization systems 10, the one or more user computer systems 20, and/or the one or more third-party systems 30.

FIG. 2 illustrates a high level process flow 100 for an alternate treatment for routing for unauthorized users (e.g., identifying potential unauthorized users and/or providing alternate user treatment routings), in accordance with embodiments of the present invention. Block 110 of FIG. 2 illustrates that the one or more organization systems 10 receive a communication from a user. The communication may include authentication credentials and/or a requested action from the user. It should be understood that the one or more authentication credentials may be any type of authentication credential and/or combination of authentication credentials. For example, in some embodiments, the one or more authentication credentials may include a user identification (e.g., user name, string of characters—numbers, alphabetic and/or symbols, e-mail address, phone number, or the like) and/or a password, computer system identification (e.g., mobile device identifier, laptop device identifier, or the like), biometric identification (e.g., fingerprint, eye scan, facial recognition, or the like), security questions, or the like. Moreover, the requested action may be a request to access information from the organization (e.g., confidential information of the organization, user information, and/or resource information, or the like). For example, the confidential information of the organization may be customer information, organization operational information, organization resource information, or the like. In other examples, the user information may be personal information of a particular user, such as a customer, employee, representative, or the like (e.g., legal name, SSNs, addresses, phone numbers, or the like), while the user resource information may include resource pool information for the resource pools of the user (e.g., resource pool numbers, resource pool balances, resource pool interactions, such as transactions for products—goods and/or services, transfers, withdrawals, deposits, related resource pools and associated resource pool information from within the organization or with third-parties link together, or the like). It should be understood that as discussed herein, when an authorized user and/or a unauthorized user takes an action or initiates any form of communication, it may be performed by the authorized user and/or unauthorized user, or it may be performed by the authorized user computer system 20 and/or unauthorized user computer system 20, and/or other third-party system 30 for the authorized user and/or the unauthorized user.

Block 120 of FIG. 2 illustrates that user information and/or user computer system information is captured from the user. This information can be used by the organization systems 10 to determine the identity of the user entering into the communication, making an action request, and/or taking the action and may be compared to data in the datastore 19 in order to determine if the user 4 or user computer system 20 has previously communicated with and/or made an action request from the organization systems 10. For example, the one or more organization systems 10 may utilize user information, computer system information, or the like that is captured from the user 4 and/or user computer systems 20 from the communication from the user 4 in order to determine the identity of the user 4 entering into the communication. The identity of the user 4 entering into the communication may be associated with other information stored by the organization systems 10, such as other authentication credentials, previous actions of the user, one-time credentials previously presented to the user, resource pool information, user information, and the like. In addition, the organization systems 10 may communicate the captured information to third party systems 30 for further data sharing and identification capabilities (e.g., share captured information with third-parties in order to determine if the user has been identified by another organization). In some embodiments, there may be a channel of communication established over network 2 between one or more third-party systems 30 and/or organization systems 10 to share information and enhance the ability of both systems to identify the users and/or user computer systems 20 based on the captured information.

FIG. 2 illustrates in block 130 that the one or more organization systems 10 may determine if the user is an unauthorized user by comparing the user information and/or user computer system information captured from the user 4 with stored information about unauthorized users. In some examples, the one or more organization systems 10 may access information regarding unauthorized users (e.g., a databases of unauthorized users and associated numbers, addresses, e-mail accounts, IP addresses, computer system identifications, Wifi identifiers, or other like information stored that may be related to identified unauthorized users). In other examples, patterns may be stored for unauthorized users that illustrate user actions over time that may indicate that the user 4 in the present communication may potentially be an unauthorized user. For example, if the same system (e.g., based on IP address, phone number, or other system identifier) tries to access multiple accounts of different users within a time period (e.g., access three different user resource pools within 15 minutes, or the like) the system may be identified as an unauthorized user computer system. It should be understood, the determination of the whether or not the user 4 and/or user computer system 20 is an authorized user and/or unauthorized user computer system may be based on the rules determined by each organization. For example, each organization may determine what user information, computer system information, and/or patterns of each user 4 may identify the user 4 as potentially an unauthorized user.

In some embodiments, a user 4 may have an established history of communicating over a particular channel (e.g., telephone, chat, e-mail, Internet phone, website, online portal, or the like) and/or with third party systems 30 that may indicate a pattern of unauthorized activity, and the third party systems 30 may share this information over network 2 with the organization systems 10. In some embodiments, the third party systems 30 may be other organizations that are in the same business or industry as the organization, and thus, may share information in order to identify unauthorized users. In other embodiments, third party systems 30 may represent a specialized organizations, such as an investigative agency that has identified unauthorized user activity associated with specific user information, user computer information, and/or user behavior patterns. The data associated with specific user information, user computer information, and user behavior patterns may exist solely with the organization systems 20 or third party systems 30, and/or may be exist with both parties. In some instances accessing user information from third parties may require the organization systems 10 to initiate a request for third party verification or correlation of captured user information over the network 2.

Block 140 of FIG. 2 illustrates that in response to determining that the user 4 involved in the communication is, or is potentially, an unauthorized user, the one or more organization systems 10 may provide an alternate treatment (e.g., randomized treatment, or the like) to the unauthorized user. For example, the alternate treatment may be different than what treatment would be provided to an authorized user, or what treatment may be typically provided to an unauthorized user (e.g., ending the communication with the unauthorized user). In some embodiments, the alternate treatment provided by the organization systems 10 may be randomized from a group of possible alternate treatments 230. In this way, the unauthorized user is prevented from preparing for or anticipating the alternate treatment. It should be understood that the alternate treatment may be based on the communication channel through which the unauthorized user is entering into the communication (e.g., call—Internet or telephone call, Internet chat, request made through a portal provided over the Internet, or the like); the request the unauthorized user is making (e.g., request to access confidential information, request to change a password, request to change contact information, request to enter into an interaction—from a specific resource pool, for a resource amount, to an associated resource pool, or the like); the identity of the user (e.g., if the unauthorized user can be identified as a specific repeat unauthorized user to which alternate treatments have been previously provided); or the like.

In some embodiments, the alternate treatment presented to an unauthorized user may be further based on a determination of what one or more alternate treatments were previously presented to the unauthorized user. For example, if the last time the unauthorized user communicated over a telephone call, the unauthorized user was placed on hold for an extended period of time (e.g., 2, 3, 4, 5, 10, or the like times the normal wait time), the next time the unauthorized user is identified, the unauthorized user may be transferred to one or more different representatives (e.g., to extend the communication time of the unauthorized user), while the next time the unauthorized user is identified, an indication may be provided to the unauthorized user that particular features related to the unauthorized user's action request are not currently available. As such, the alternate treatments presented to the unauthorized user may morph based on the action requests of the unauthorized user and the alternate treatments previously presented to the unauthorized user.

It should be understood that in the situations where a representative of the organization is communicating with the unauthorized user, the representative may or may not know that the unauthorized user has been identified as unauthorized (e.g., potentially unauthorized or confirmed as unauthorized). In some instances it may be beneficial for the representative to be unaware that the unauthorized user is unauthorized because the representative may be unfamiliar with handling unauthorized users. As such, in some embodiments, the one or more organization systems 10 may provide recommended alternate treatments (e.g., escalation to a particular group of representatives that handle potential misappropriation, extension of the communication, recommended inquires to ask the unauthorized user, or the like) without indicating to the representative the reason for the recommended alternate treatment. In other embodiments, the representative may be aware that the unauthorized user has been identified as unauthorized. In some embodiments, if the representative is aware that the unauthorized user is unauthorized then the representative may be able to apply specific alternate treatments based on the communication with the unauthorized user. Various other alternate treatments that may be provided to the unauthorized user are outlined in FIG. 3 and are discussed in more detail in that section of the specification.

Block 150 of FIG. 2 further illustrates that the one or more organization systems 10 capture information from the unauthorized user based on the unauthorized user's responses to the alternate treatment. As discussed above, and in further detail below, the alternate treatment may be implemented not only to prevent the unauthorized user from realizing that the unauthorized user has been detected, but also to monitor the unauthorized user in order to capture information from the unauthorized user that may help to identify other unauthorized users and/or deter (e.g., reduce or prevent) further unauthorized access. For example, the one or more organization system 10 may be able to capture other personal information from the unauthorized user, may be able to determine how the unauthorized user operates based on alternative information, and/or may be able to determine other resource pools and/or other unauthorized users that the unauthorized user communicates with and/or transacts with.

As will be described in further detail herein, the one or more organization systems 10 gain advantages from randomizing the alternate treatments provided to the unauthorized users. For instance, if the organization systems 10 provides randomized alternate treatments, the unauthorized users are not able to decipher a specific set of treatments to routinely expect from the organization systems 10. As such, the unauthorized users are not able to discern whether or not they have been detected as unauthorized based on the treatment pattern alone. Additionally, the unauthorized users may not have the information required by every specific alternate treatment possibility, and therefore, the task of additional verification for suspected unauthorized users includes an additional level of complexity. Furthermore, the organization system 10 may gain a better understanding of the authorized user by observing genuine reactions from the unauthorized users which are prompted by the randomized alternate treatments. For instance, the unauthorized user may have a scripted or recorded response to a certain treatment for which they expect to be provided from the system at a certain point in the authorization process. By randomizing the alternate treatments provided to suspected or confirmed unauthorized users, the system may place the user in a situation where they must revert to producing an original response. This allows for additional data points to be collected by the organization system 10 in order to analyze the behavior and activity patterns of specific unauthorized users. These additional data points allow the organization system to categorize the unauthorized user in more detail and later identify the unauthorized user with a higher degree of confidence.

FIG. 3 illustrates a high level process flow 200 for an alternate treatment for routing for unauthorized users including alternate treatments 230 that may be provided to unauthorized users in accordance with embodiments of the present invention. A number of possible alternate treatments 230 for unauthorized users are described in further detail below; however, it should be understood that the possible alternate treatments 230 discussed below are not an exhaustive list of possible alternate treatments.

As shown by block 210, the system 10 determines which alternate treatments have already been provided to the unauthorized user based on information contained about unauthorized user. By varying the alternate treatment provided to each unauthorized user, the system thwarts the ability for any single user to gain knowledge that may help them anticipate system processes and take advantage of them in some way. For instance, the unauthorized user may have received a request for additional contact information during its last attempt to access resource pool information and may have retrieved such information since the unauthorized user's previous communication. The system 10 recognizes the unauthorized user based on characteristics of the communication or authentication credentials provided and the system 10 provides a new alternate treatment that has not previously been provided to the unauthorized user, as shown by block 220. In this way, even though the unauthorized user may have prepared or obtained the requisite information to access the system based on a previous access attempt, the system 10 can adapt to thwart unauthorized access. The variation of alternate treatments for unauthorized users may also be applied in a group setting. For instance, if the system 10 recognizes, based on communication parameters, authentication credentials, or information received from some other source, such as a third party source, that two or more unauthorized users are acting as a group, the system 10 can take this fact into account when determining which alternate treatments have already been provided to the unauthorized users. Assuming that the unauthorized users are acting in concert, it may be beneficial to vary the alternate treatments such that no two users in the group receive the same alternate treatment within a given time period for the reasons stated above. Additionally, the system 10 may randomly select the alternate treatment from a group of available alternate treatments that have not previously been provided to the unauthorized user or group of unauthorized users. In this way, the unauthorized user or group of unauthorized users will be unable to determine a pattern of alternate treatments that are provided by the system 10 in every instance of repeated, unauthorized contact. Additionally, as mentioned previously, the unauthorized users may not have the information required by every specific alternate treatment possibility, and therefore, the task of additional verification for suspected unauthorized users includes an additional level of complexity. Utilizing a randomization process for selecting alternate treatments also increases the likelihood of eliciting genuine reactions from the unauthorized users which are prompted by the randomized alternate treatments. For instance, the unauthorized user may have a scripted or recorded response to a certain treatment for which they expect to be provided from the system at a certain point in the authorization process. Randomizing the alternate treatments provided to the unauthorized user increases the likelihood that the unauthorized user will be unprepared to respond to a particular alternate treatment and places the user in a situation where they must revert to producing an original response.

While the system 10 can provide a variety of possible alternate treatments 230, the treatments themselves require some congruity in order to remain believable to the unauthorized user or group of unauthorized users. For instance, if the system 10 provides alternative resource pool information via a mock website interface to an unauthorized user during its first attempt to access this information, the system 10 may log this information for future use with the same unauthorized user. If the unauthorized user were to attempt to access the system a second time, perhaps via a separate channel of communication such as via telephone, it would be important for the system 10 to provide the same alternative resource pool information as before, or at least slightly alter the resource pool information in a believable way. Avoiding inconsistencies between the information provided in various alternate treatments increases the likelihood that the unauthorized user will remain unaware and unsuspecting of the fact that they are receiving false resource pool information and the like, thereby decreasing the likelihood that the unauthorized user will realize they have been detected.

In some examples, the unauthorized user may enter into a communication through a call (e.g., telephone call, Internet call, or the like), prompting the one or more organization systems 10 to provide an alternate treatment of placing the unauthorized user on hold for an extended period of time, as shown in block 232 (e.g., 2, 3, 4, 5, 6, 7, 8, 9, 10, times the normal hold time for an authorized user). The increased hold time may allow the one or more organization systems 10 to gather more information about the unauthorized user, or may deter the unauthorized user from continuing an attempt at access. The length of the hold time may be varied by the systems 10 in order to give the appearance that the hold times are naturally based on a high volume of communications with respect to a limited amount of available resources. At some time before or during the hold period, the one or more organization systems 10 might also request additional contact information for the unauthorized user and suggest to contact the unauthorized user at the end of the hold period for the convenience of the unauthorized user. In this instance, the offer to contact the unauthorized user in the future is made with the objective in mind of obtaining more usable information about the identified unauthorized user (e.g., additional contact information, such as additional phone numbers, e-mail addresses, or the like).

As another example alternate treatment, in the instance where the unauthorized user is entering into a communication through a chat over the Internet, the alternate treatment may be the same or similar to the alternate treatment for a telephone call. As such, the alternate treatment may include placing the unauthorized user on hold or an extended period of time, requesting additional contact information, providing alternative resource pool information, providing alternative authentication credentials, providing a request identifier, or other like treatment in order to monitor and capture information from the unauthorized user.

As another example, after determining that an unauthorized user has made an action request to access particular information, the organization may provide alternative information, as shown by block 234 (e.g., fake information that has no actual meaning). For example, if an unauthorized user is requesting information related to a resource pool, the one or more organization systems 10 may provide alternative resource pool information to the identified unauthorized users (e.g., provide reduced balances, or the like). For example, by providing a reduced resource pool balance than what is actually in the resource pool, it may prevent an unauthorized user from trying to misappropriate the resources from the resource pool (e.g., indicate that the resource pool only has a balance of $15, and thus, not worth the time for an unauthorized user to try to access). In some embodiments, after an unauthorized user is identified a pattern may also be identified for the unauthorized user. The pattern may indicate that the unauthorized user does may take actions within resource pools that have balances below a threshold value. As such, the random treatment may be to provide an alternative resource pool balance below the threshold value.

In other examples, the one or more organization systems 10 may provide other alternative information to an unauthorized user, such as alternative user information (e.g., alternative information may include imitation, randomly generated, adversarial user name, or the like such as fake information that has no actual meaning), other alternative resource pool information (e.g., imitation linked accounts, or the like), alternative interactions information (e.g., transactions, or the like), or the like in order to allow the one or more organization systems 10 to track and/or monitor the unauthorized user. For example, an alternative resource pool interface may be provided that allows the unauthorized user to take actions within the alternative resource pool interface that the unauthorized user believes is real in order to capture other unauthorized users (e.g., names, or the like), other contact information (e.g., e-mail addresses, phone numbers, or the like), and/or other resource pool information (e.g., resource pool numbers, locations, or the like) with which the unauthorized user is trying to interact. For example, the unauthorized user may be trying to transfer alternative resources from the alternative resource pool to an actual resource pool of the unauthorized user. In this way, the unauthorized user is given the impression that they have not been detected, allowing the one or more organization systems 10 to monitor the behavior of the unauthorized users for a longer period of time.

In other examples, the alternate treatment that is presented to the unauthorized user may be an indication that the organization has to investigate the request of the unauthorized user, or that the organization has completed the request from the unauthorized user, and as such the organization systems 10 may provide a request identifier, as shown in block 236, (e.g., ticket number, request number, or the like) to the unauthorized user for future reference. The request identifier may be a specific number that the organization systems 10 recognize as being associated with an unauthorized user. For example, should the unauthorized user utilize the request identifier in the future in order to check on the status of an action request made by the unauthorized user and/or use the request identifier in order to repeat a previous action request then the organization systems 10 can automatically identify the user as an unauthorized user based on the request identifier provided by the unauthorized user.

In some embodiments, the alternate treatment may be indicating to the unauthorized user that one or more particular features associated with an action request from the unauthorized user is disabled, as shown by block 238. In this way, the organization systems may present some of the information (e.g., actual information and/or imitation information) in which the unauthorized user is interested, but not provide the complete set of information. As such, the information provided to the unauthorized user is not useful to the unauthorized user, but may extend the communication with the unauthorized user, and/or may allow the organization to provide additional alternate treatments. For example, in response to indicating that some features are not available the organization may request additional contact information to follow-up with the unauthorized user, may provide a request identifier to track the unauthorized user, may provide alternative information to the user, or the like.

In some embodiments, the alternate treatment may include the systems 10 providing alternative authentication credentials (e.g., alternative authentication credentials may include imitation security questions and/or answers, imitation passwords or user names, incorrect security questions and/or answers, incorrect passwords or user names, or the like) to the unauthorized user, as shown by block 240. As such, when such alternative authentication credentials is utilized in the future then the unauthorized user may be identified. For example, should the unauthorized user request access to the user information, the organization system 10 may present the unauthorized user with an alternative address, alternative phone number, alternative user identification or the like. As such, should the one or more organization systems 10 receive the alternative address, the alternative phone number, the alternative user identification, or the like, or combinations thereof in the future associated with a request from a user, then the one or more organization systems 10 may be able to identify the user as an unauthorized user. In other examples, should the unauthorized user attempt to answer certain security questions, the organization may provide alternative security answers to the unauthorized user. As such, when the unauthorized user tries to access information from the organization in the future using the alternative security answers, then the organization systems are able to identify the user as unauthorized and present additional alternate treatments to the unauthorized user and/or capture additional information about the unauthorized user.

In the instance where the unauthorized user is entering into a communication to access information over the Internet or on a call (e.g., access resource pool information, or the like), the alternate treatment may be extending the time for which a response to the request is instituted (e.g., provide an icon, such as a buffering icon, an error message, or the like), delaying the time for the response in order to identify and/or create an alternative interface to display to the unauthorized user, as shown by block 242. For instance, the one or more organization systems 10 may identify a specific user computer that is known to be associated with unauthorized access. As such, in the event that an unauthorized user is attempting to enter into a communication to access a resource pool through an online portal, website, computer program or the like, the one or more organization systems 10 have ample opportunities to stall communication while creating the appearance of naturally occurring communication issues (e.g., buffering, Internet connectivity, or the like). For instance, the response time from the one or more organization systems 10 through an online portal may be reduced to create the appearance of a bad internet connection, overloaded server volume, or browser compatibility issue. The stalling communication may create a lag-time or delay in communication, or may indicate a totally failed connection. In some embodiments, the one or more organization systems 10 may request or suggest that the identified unauthorized user attempt to access the online portal using a different Wifi or data connection, different browser, and/or different user computer system (e.g., hardware or applications—indicate that the mobile device and/or application do not meet system requirements). Should the unauthorized user utilize a different computer system or connection means, the organization system is able to capture additional information about the unauthorized user. For instance, an unauthorized user may have inadvertently enabled location services for a specific device or application, which these features were disabled in the unauthorized user's primary device or application used to make the initial communication. In other examples, the location of the unauthorized user may be determined if they are required to communication through a particular Wifi connection. In these examples, the alternate treatment increases the likelihood that the system 10 is able to gather useful information about the unauthorized user and also deters the attempt at unauthorized access while avoiding the appearance that the unauthorized user has been detected.

As other examples of alternate treatments, in the instance where the unauthorized user is entering into any form of communication with the one or more organization systems 10, the unauthorized user may be provided with a tagged one-time credential (e.g., one-time password, or the like) to access the system, as shown by block 244. The tagged one-time credential may be embedded with markers that allow the organization systems 10 to monitor the unauthorized user and/or any action requests made through the use of the alternative one-time credential. For example, when the unauthorized user tries to utilize the tagged one-time credential, the organization systems 10 may identify the user as unauthorized and determine how to respond. For the purposes of capturing further information, the one or more organization systems 10 may request a separate channel of communication be used to transmit the tagged one-time credential, such as in a two factor authentication process. The organization system 10 may request an alternate email, telephone number, or the like to transmit the tagged one-time credential and may subsequently log the email address, telephone number and the like for later reference and identification purposes.

In some embodiments, the tagged one-time credential may trigger an alert on the backend of the one or more organization systems 10 to alert the representative that they are communicating with an unauthorized user. In other embodiments, the triggered alert may not be displayed to the representative communicating with the unauthorized user in order to avoid a change in the particular representative's behavior. In other embodiments, the use of the tagged one-time credential may escalate the communication within the system such that the communication is re-routed to another representative trained to interact with unauthorized users.

In other examples, when the unauthorized user is entering into a communication over a call or Internet chat, the alternate treatment may include the one or more organization systems 10 requesting that the unauthorized user call back using a different telephone number, communicate using a different user computer system 10 or application, or the like. The systems 10 may defer to a number of reasons to justify this request, including a "poor connection," low audio quality, difficulty hearing the user, a policy restriction on communicating via a particular channel (e.g., a blocked phone number, private phone number, or the like). In this way, this alternate treatment increases the likelihood that the user will provide additional information that the systems 10 may retain for later reference and identification purposes.

In some embodiments, the one or more organization systems 10 may request that the unauthorized user provide additional information related to a user in order to proceed. For example, the organization systems 10 may request a specific piece of information that the unauthorized user already knows in order to create a false sense of confidence in the unauthorized user that they have bypassed an additional level of security. In some instances, the organization systems 10 may vary the request for additional information such that the unauthorized user is required to make several access attempts before they are allowed to succeed. This manufactured trial and error situation via alternate treatment, as shown at block 248, increases the likelihood that the unauthorized user genuinely believes they have bypassed the system security undetected, when in reality the one or more organization systems 10 are aware that the user is unauthorized and is instead using the increased communication to gather more potentially useful information about the unauthorized user.

As discussed herein, it should be understood that markers may be utilized along with information presented to the unauthorized user (e.g., the alternative information, the request identifiers, the alternative one-time credential, or the like). For example, should the unauthorized user request user information, security information, resource pool information, or the like, the one or more organization systems 10 may provide alternative user information, alternative security information, alternative resource pool information, or the like along with embedded markers that allow the organization systems 10 to track where such alternative information is sent and/or used.

It should be understood that all of the possible alternate treatments 230 have not been discussed, and the alternate treatments may change over time for the same unauthorized user and/or based on the type of action request made by the unauthorized user. In addition, the alternate treatment for a user may change if multiple unauthorized users or user computers are recognized by the one or more organization systems 10 as being associated. For instance, the one or more organization systems 10 would avoid providing the same alternate treatment to two unauthorized users that may be related (e.g., of the same group). However, the recognition that two users are operating as a group may also prompt the one or more organization systems 10 to include some level of consistency in the alternate treatments to each of the users to provide a false sense that the unauthorized users have successfully misappropriated information from the one or more organization systems 10. As an example, two unauthorized users operating in a group may both attempt to access the same resource pool information. In this situation, it would be ideal for the organization systems 10 to display the same credentials, resource pool amounts, alternative information, or the like (e.g., even if the information is fake) in order to avoid indicating to the users that the organization systems 10 are displaying different credentials, resource pool amounts, or the like.

In order to prevent the unauthorized user from realizing that the unauthorized user has been identified as unauthorized, the alternate treatments may allow some of the unauthorized user's requests in order to capture more information about the unauthorized user. For example, in order to capture more information from the unauthorized user, such as the other unauthorized users and/or the resource pools that the unauthorized user may utilize, the organization systems 10 may allow particular action requests. The allowed action requests may include providing the alternative information described herein, but in some embodiments the allowed action requests may include allowing some of the unauthorized user requests. For example, the organization may allow the transfer of some information or set up pending resource transfers if the unauthorized user is making transfers within the databases of the organization (e.g., resource transfers between resource pools within the organization, or the like). As such, the organization systems 10 may allow the unauthorized user to access non-confidential information and/or illustrate that the unauthorized user may be successful (e.g., providing confirmation notifications that make it appear that the user request has occurred) in order to capture additional information from the unauthorized user or the unauthorized user's associates.

In some embodiments, the one or more organization systems may provide a notification (e.g., on an interface provided to the unauthorized user over the Internet, over a call with a representative, or the like), indicating that the unauthorized user's request was allowed. However, in the future, the organization systems 10 may provide follow-up communication with the unauthorized user indicating that the request did not occur because of a particular reason (e.g., availability of resources, application errors, or other like notifications that the request did not process for a specific reason). The follow-up notification may include a request for the unauthorized user to contact the organization, or representative thereof, and in response additional information may be captured from the unauthorized user. For example, the one or more organization systems 10 may be able to capture additional contact information (e.g., phone number, computer IP address, e-mail, or the like), that the unauthorized user may be using in order to follow up with the organization.

Generally, it should be understood that the organization will provide random alternate treatments for handling an unauthorized user. In some embodiments, the organization would create random responses to the unauthorized user such that the unauthorized user does not know that he/she has been identified as an unauthorized user, and/or is unable to determine how he/she is going to be treated by the organization. As such, if the unauthorized user is unaware of whether or not the organization has identified the unauthorized user as unauthorized, and the unauthorized user is unable to predict how the organization with handle the unauthorized user for specific requests, then the unauthorized user is less likely to develop and implement responses to misappropriate information from the organization or its authorized users. It should be further understood that it may be beneficial to prevent the unauthorized user from knowing that he/she has been identified as unauthorized because should the unauthorized user realize that the unauthorized user has been identified as unauthorized, then the unauthorized may be just end the communication (e.g., call or other action occurring through a portal, or the like) with the organization and create a new communication with the organization through a different channel (e.g., move from phone interaction to Internet interaction, or the like) or a different contact through the same channel (e.g., new phone, new computer system, new IP address, or the like).

It should be understood, that the systems described herein may be configured to establish a communication link (e.g., electronic link, or the like) with each other in order to accomplish the steps of the processes described herein. The link may be an internal link within the same entity (e.g., within the same organization) or a link with the other entity systems. In some embodiments, the one or more systems may be configured for selectively responding to dynamic authentication inquires. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 8398US1.014033.3208 | 15/995,830 | ALTERNATE USER COMMUNICATION ROUTING | Jun. 1, 2018 |
| 8399US1.014033.3209 | 15/995,824 | ALTERNATE USER COMMUNICATION ROUTING UTILIZING A UNIQUE USER IDENTIFICATION | Jun. 1, 2018 |
| 8400US1.014033.3210 | 15/995,831 | ALTERNATE USER COMMUNICATION ROUTING FOR A ONE-TIME CREDENTIAL | Jun. 1, 2018 |
| 8401US1.014033.3211 | 15/995,837 | ALTERNATE DISPLAY GENERATION BASED ON USER IDENTIFICATION | Jun. 1, 2018 |
| 8402US1.014033.3212 | 15/995,894 | ALTERNATE USER COMMUNICATION HANDLING BASED ON USER IDENTIFICATION | Jun. 1, 2018 |

What is claimed is:

1. A system for alternate user communication routing, the system comprising:
one or more memory components having computer readable code store thereon; and
one or more processing components operatively coupled to the one or more memory components, wherein the one or more processing components are configured to execute the computer readable code to:
receive a request for an action via a communication from a user via a communication channel from one or more communication channels;
determine authentication credentials for the user from the communication;
determine that the user is an unauthorized user based on the authentication credentials;
identify one or more previous alternate treatments provided to the unauthorized user;
select an alternate treatment based on the one or more previous alternate treatments, wherein the alternate treatment is different than the one or more previous alternate treatments;
provide the alternate treatment to the unauthorized user; and
capture information from the unauthorized user based on the communication and the user's response to the alternate treatment.

2. The system of claim 1, wherein the authentication credentials are user information or device information received from the communication.

3. The system of claim 1, wherein the alternate treatment comprises providing an extended period of hold time via one or more communication channels.

4. The system of claim 1, wherein the alternate treatment comprises providing alternative resource pool information.

5. The system of claim 1, wherein the alternate treatment comprises requesting additional contact information from the unauthorized user in order to contact the unauthorized user at a later time via a second communication channel.

6. The system of claim 1, wherein the one or more processing components are further configured to execute the computer readable code to:
alert a representative communicating with the unauthorized user that the unauthorized user is unauthorized.

7. The system of claim 1, wherein the one or more processing components are further configured to execute the computer readable code to: prevent alerting a representative communicating with the unauthorized user that the unauthorized user is unauthorized.

8. The system of claim 1, wherein the alternate treatment comprises:
requesting a first additional authentication credential;
receiving a first response with the first additional authentication credential from the unauthorized user;
denying access to the unauthorized user based on the first response;

requesting one or more additional authentication credentials;

receiving one or more additional responses with the one or more additional authentication credentials from the unauthorized user; and based on the one or more additional responses, granting the action requested by unauthorized user with limitations.

9. The system of claim 1, wherein the alternate treatment comprises disabling one or more particular features associated with an action request from the unauthorized user.

10. The system of claim 1, wherein the alternate treatment comprises providing a request identifier, wherein the request identifier is a specific number associated with the unauthorized user.

11. The system of claim 1, wherein the alternate treatment comprises providing one or more alternative authentication credentials to the unauthorized user, wherein the alternative authentication credentials are specific to the unauthorized user or a particular group of unauthorized users.

12. The system of claim 1, wherein the alternate treatment comprises creating an appearance of naturally occurring communication issues by extending a time period for which a response to the request for action is instituted.

13. The system of claim 1, wherein the alternate treatment comprises providing a tagged one-time authentication credential, wherein the tagged one-time authentication credential a specific string of characters or phrases specific to the unauthorized user.

14. A computer implemented method for alternate user communication routing, the method comprising:

receiving, by one or more processor components, a request for an action via a communication from a user via a communication channel from one or more communication channels;

determining, by one or more processor components, authentication credentials for the user from the communication;

determining, by one or more processor components, that the user is an unauthorized user based on the authentication credentials;

identifying one or more previous alternate treatments provided to the unauthorized user;

selecting an alternate treatment based on the one or more previous alternate treatments, wherein the alternate treatment is different than the one or more previous alternate treatments;

providing, by one or more processor components, an alternate treatment to the unauthorized user; and capturing, by one or more processor components, information from the unauthorized user based on the communication and the user's response to the alternate treatment.

15. The method of claim 14, wherein the authentication credentials are user information or device information received from the communication.

16. The method of claim 14, wherein the alternate treatment comprises providing an extended period of hold time via one or more communication channels.

17. The method of claim 14, wherein the alternate treatment comprises providing alternative resource pool information.

18. A computer program product for alternate user communication routing, the computer program product comprising at least one non-transitory computer-readable medium having computer-readable program code portions embodied therein, the computer-readable program code portions comprising:

an executable portion configured to receive a request for an action via a communication from a user via a communication channel from one or more communication channels;

an executable portion configured to determine authentication credentials for the user from the communication;

an executable portion configured to determine that the user is an unauthorized user based on the authentication credentials;

an executable portion configured to identify one or more previous alternate treatments provided to the unauthorized user;

an executable portion configured to select an alternate treatment based on the one or more previous alternate treatments, wherein the alternate treatment is different than the one or more previous alternate treatments;

an executable portion configured to provide an alternate treatment to the unauthorized user; and an executable portion configured to capture information from the unauthorized user based on the communication and the user's response to the alternate treatment.

19. The computer program product of claim 18, wherein the authentication credentials are user information or device information received from the communication.

20. The computer program product of claim 18, wherein the alternate treatment comprises providing an extended period of hold time via one or more communication channels.

* * * * *